United States Patent Office 3,194,035
Patented July 13, 1965

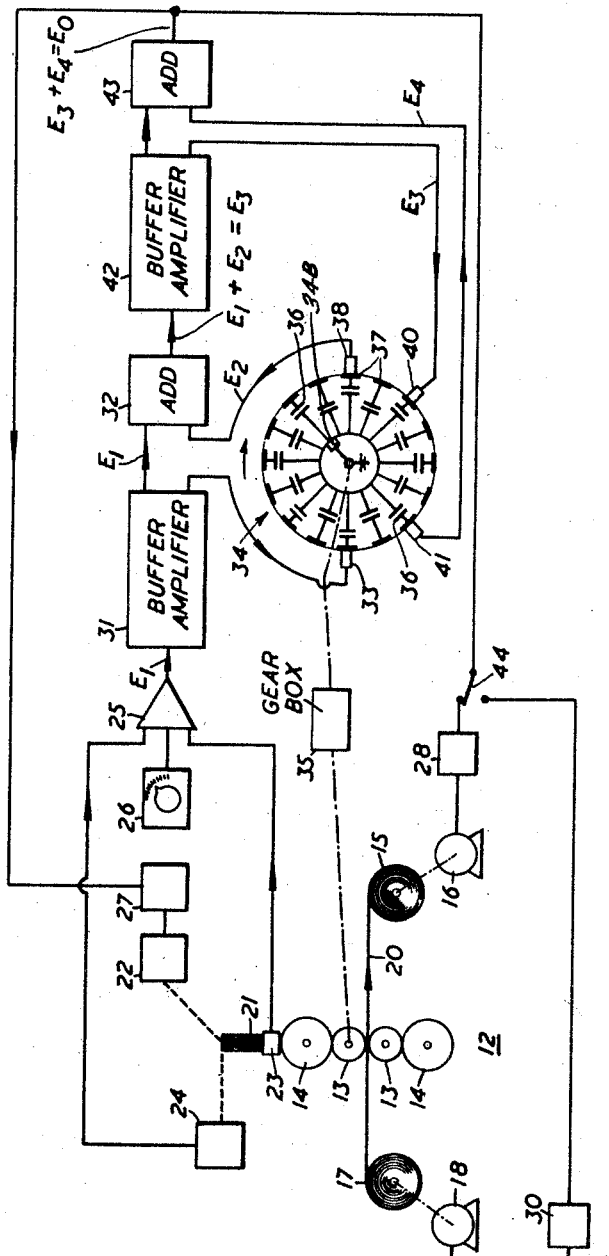

3,194,035
SYSTEM FOR ELIMINATING CYCLIC VARIATIONS
IN ROLLING MILL GAUGE ERRORS
Joseph Peter Smith, Sheffield, England, assignor to Davy
and United Instruments Limited, Sheffield, England
Filed May 4, 1962, Ser. No. 192,405
Claims priority, application Great Britain, May 8, 1961,
16,605/61
11 Claims. (Cl. 72—8)

This invention relates to systems for removing an undesired component from an electric signal, particularly a signal representing the gauge error of strip leaving a stand of a rolling mill. The invention is primarily concerned with automatic gauge control systems employing a gauge error signal generator which includes a rolling load indicator; such an error signal generator is described in a paper entitled "Gaugemeter for Strip Mills" in "Engineering" of January 9, 1953, and the error signal produced may be employed to control the separation of the rolls and/or the tension in the strip to automatically control the gauge of the material leaving the stand.

Most mills suffer from roll and bearing eccentricity, with the result that the gauge error signal contains a component having the frequency of rotation of the rolls and harmonics thereof. The gauge variations due to eccentricity may be greater than the mean gauge variations which represent the real performance of the controller. In such circumstances, it is impossible to increase the gain of the control system, in order to increase overall performance, since the presence of the eccentricity variations with a high gain produces erratic operation and increases stability problems.

One aspect of the present invention, for use in an automatic gauge control system for rolling mills employing a gauge error signal generator, which includes a rolling load indicator, resides in a circuit for removing partly the variations in the gauge error signal resulting from roll eccentricity, comprising a delay circuit to which the gauge error signal is applied and which delays the signal by a fraction of the period of the first harmonic, i.e. the fundamental, of the eccentricity variation, and means for adding together the gauge error signal and the delayed signal. Preferably, the delay circuit gives a delay equal to half the period of the first harmonic of the eccentricity variation, whereby all odd harmonics of the eccentricity variation are removed from the gauge error signal. By subsequently delaying the first delay signal by one quarter of the period of the first harmonic, and adding the resulting signal to the first delayed signal, odd/even harmonics may be similarly removed. Odd/even harmonics are the second, sixth, tenth and other $2n$th harmonics, where $n$ is an odd number.

The invention will be more readily understood by way of example from the following description of an automatic gauge control system for a rolling mill, reference being made to the accompanying drawing which diagrammatically illustrates the system.

In the drawing, the mill 12 is illustrated as a reversing mill, having work rolls 13, back-up rolls 14, a coiler 15 driven by its motor 16, and an uncoiler 17 driven by its motor 18. It will be appreciated that in successive passes the strip 20 moves in opposite directions and the functions of the coiler 15 and uncoiler 17 are reversed. The roll setting, or the separation of the rolls 13 with no strip therebetween, is adjusted by screws 21 driven by a motor 22 and acting on the chocks of the upper back-up rolls 14 through load cells 23 which detect the rolling load in the mill. The roll setting is measured by a position potentiometer or other device 24, coupled to the screws 21. As described in the above-mentioned paper in "Engineering" signals from the load cells 23 and the potentiometer 24 are applied to an amplifier 25 in opposition to the signal from a manually set potentiometer 26 which sets the thickness to which the strip 20 is to be rolled. The amplifier 25 produces an output signal $E_1$ representing the departure from the required thickness set by potentiometer 26, of the thickness of the strip 20 leaving the rolls 13.

The screwdown motor 22, the coiler motor 16 and the uncoiler motor 18 have control circuits 27, 28, 30 respectively, normally operated by the gauge error signal $E_1$ to maintain the strip thickness at the required value set by the potentiometer 26.

The gauge error signal $E_1$ contains a component due to the eccentricity of the back-up rolls 14 and having the frequency of rotation of those rolls 14 and harmonics thereof. The variations in the signal due to roll eccentricity is frequently greater than the mean gauge variations which the control system is to correct. If the error signal $E_1$ is used to control the screwdown control circuit 27 and/or the tension control circuit 28 or 30, the control system will be continuously operated in an attempt to compensate for gauge variations due to roll eccentricity. In such circumstances it is impossible to increase the overall performance of the control system, since the components due to roll eccentricity in the error signal $E_1$, together with a high gain in the system, produces erratic operation and increases stability problems.

The system illustrated in the drawing therefore includes elements designed to remove from the gauge error signal $E_1$ most of the components due to roll eccentricity. Thus the signal $E_1$ is applied through a buffer amplifier 31 to a summing circuit 32 and to one brush 33 of a commutator 34. This commutator 34 is driven by the work rolls 13 through a variable gear box 35 which is so set that the commutator 34 makes one revolution for one revolution of the back-up rolls 14, the variable gear box 35 being adjusted as required at each roll change to compensate for changes in work roll diameter. The commutator carries a large number of condensers 36, one terminal of each of which is connected to a common slip ring 34A continuously contacted by a grounded brush 34B. The other terminals of the condensers are each separately attached respectively to a different corresponding conducting segment 37 on the commutator. Besides the brush 33, the commutator 34 has three further brushes 38, 40 and 41, all of which make rubbing contact with the segments. The pair of brushes 33, 38 are set diametrically opposite one another with respect to the axis of the commutator 34, while the brushes 40, 41 are spaced apart, so that they subtend a right angle at the axis of the commutator; brushes 40, 41 are disposed midway between brushes 33, 38.

The signal $E_1$ and the signal $E_2$ from brush 38 are applied to the adding circuit 32 and the resulting signal $E_3$ is applied through a buffer amplifier 42 to a second summing circuit 43 and to the brush 40. The signal $E_4$ from brush 41 is also applied to the summing circuit 43, from which the output signal $E_0$ appears.

Because of its coupling with the rolls, the commutator 34 is driven at the same speed as the back-up rolls 14 and therefore at the frequency of the first harmonic of the eccentricity variations. As a result, the commutator 34 and the brushes 33, 38 act as a delay circuit for the input signal $E_1$, the signal $E_2$ being delayed by half the period of the first harmonic of the eccentricity variations, with respect to the signal $E_1$. Because of the delay produced by the commutator, the odd harmonics of the eccentricity variations are absent from the output signal $E_3$ from the summing circuit 32. Similarly, the commutator 34 and the brushes 40, 41 act as a second delay circuit, producing a delay equal to one quarter of the period of the first harmonic of the eccentricity variation; signal $E_4$ is thus delayed by this amount with respect to the signal $E_3$, with the result that when signals $E_3$, $E_4$ are added together in circuit 43, the odd/even harmonics of the eccentricity variation are removed and the output signal $E_0$ contains only the even/even harmonics, i.e. the fourth, eighth, twelth etc. harmonics. The remaining harmonics are so negligible that the gain of the control system as a whole can be safely increased without encountering stability difficulties.

The modified error signal $E_0$ is shown as applied in parallel to the control circuit 27 for the screwdown motor 22 and, through a change-over switch 44 to the control circuit 28 or 30 for the motor 16 or 18, respectively. When the strip 20 is moving in the direction indicated, control circuit 28 is put into circuit to control the strip tension in accordance with the modified error signal $E_0$ while when the strip is drawn through the mill in the opposite direction, control circuit 30 is alternatively put into circuit. As is known, the system operates by varying the strip tension and/or the roll setting to maintain the modified error signal $E_0$ substantially at zero and hence the mean strip gauge at the required value set on the device 26.

It will be appreciated that if desired the modified error signal $E_0$ may be applied to screwdown motor control circuit 27 only, or to the tension control circuit 28 or 30 only.

It is to be understood that the number of commutator segments 37 and condensers 36 is not limited to the number shown in the drawing. Generally the larger the number of segments the more accurate is the eccentricity correction. Thirty-nine such condensers have been used in practice but a larger number is preferable.

I claim:

1. A system for producing an improved indication of the discrepancy between the mean thickness of strip leaving a rolling mill and a predetermined thickness, said system comprising means for generating an electric signal in accordance with the instantaneous discrepancy, said signal including components which cyclically vary with the rotation of the rolls of the mill, two electrically conductive paths along which said signal is transmitted, a delay circuit in one of said paths controlled by the mill rolls for relaying the signal transmitted along that path by an odd number of half-periods of rotation of the rolls, and means for adding together the signals transmitted by the two paths.

2. A system for producing an improved indication of the mean gauge error of strip leaving a rolling mill comprising means for generating an electric gauge error signal in accordance with the instantaneous gauge error, which signal includes cyclic variations resulting from roll eccentricity, a delay circuit controlled by the mill rolls for delaying the gauge error signal by half the period of rotation of the rolls, and means for adding together the gauge error signal and the delayed signal to produce a resultant signal from which some at least of the roll eccentricity variations are absent.

3. A system according to claim 2 in which the delay circuit comprises a commutator driven by the rolls, a plurality of storage devices carried by the commutator, input means for connecting the gauge error signal sequentially to the storage devices, and output means for subsequently connecting the storage devices sequentially to the adding means after a period equal to the delay period.

4. A system according to claim 3 in which the input and output means are spaced 180° apart so that the period between the connection of a storage device to the gauge error signal and the connection thereof to the output means is equal to half the period of rotation of the rolls.

5. A system according to claim 4 which further comprises a second delay circuit to which the signal from the adding means is applied and which delays that signal by one quarter of the period of the rotation of the rolls and second adding means to which are applied the signal from the first adding means and the signal from the second delay means.

6. A system according to claim 4 in which the storage devices are condensers which are connected to individual conducting segments on the commutator, and said input and output means are a pair of brushes diametrically arranged with respect to the commutator and making brushing contact with the segments, one of the brushes being connected to the gauge error signal and the other to the adding means.

7. A system according to claim 5 in which the storage devices are condensers which are connected to individual conducting segments on the commutator, and said input and output means comprise two pairs of brushes making brushing contact with the segments, one pair being diametrically arranged with respect to the commutator and the other pair subtending an angle of 90° at the commutator axis, one brush of the first pair being connected to the gauge error signal, the other brush of the first pair being connected to an input of the first adding means, one brush of the second pair being connected to the output signal of the first adding means, and the other brush of the second pair being connected to an input of the second adding means.

8. An automatic gauge control system for a rolling mill having a pair of work rolls through which the material to be rolled is passed, means for adjusting the setting of said work rollers and means for adjusting the tension of the material passing between said rollers, said system comprising means for generating electrical signals indicative of the required gauge, the rolling load in the mill and the roll setting, means for deriving from said signals a gauge error signal indicative of the departure of the gauge from said required gauge, a delay circuit controlled by said rolls for delaying said gauge error signal by one-half the period of rotation of said rollers to produce a delayed signal, means for summing said gauge error signal and said delayed signal to produce a resultant signal, and means for controlling at least one of said roll setting adjusting and said tension adjusting means by said resultant signal to maintain said resultant signal substantially zero.

9. For a rolling mill comprising a pair of work rolls, a back-up roll for each said work roll, means for adjusting the setting of said work rolls, means for applying tension to material being rolled between said work roll, and means for controlling said tension; an improved automatic control system for controlling the gauge of said material leaving said mill which comprises means for generating electrical signals indicative of the required gauge, the rolling load in the mill and said setting, means for deriving from said signals a gauge error signal indicative of the departure of said gauge from said required gauge, a delay circuit controlled by said mill and giving a delay equal to half the period of rotation of said back-up rolls, means for applying said gauge error signal to said delay circuit to produce a delayed signal, means for summing said gauge error signal and said delayed signal to produce a resultant signal, and means for applying said resultant signal to at least one of said setting adjusting and said tension controlling means to maintain said resultant signal substantially zero.

10. An automatic control system according to claim 9 in which said delay circuit comprises a commutator, means for driving said commutator at the speed of said back-up rolls, a plurality of storage devices carried by said commutator, input means for connecting said gauge error signal sequentially to said storage devices, and output means for subsequently connecting said storage devices sequentially to summing means after a period equal to half the period of rotation of said back-up rolls.

11. An automatic gauge control system according to claim 10 in which said driving means comprise a gear box driven by said back-up rolls and driving said commutator, said gear box being so arranged that said commutator makes one revolution for each revolution of said back-up rolls, and in which said input and output means are spaced 180° apart on said commutator.

References Cited by the Examiner

UNITED STATES PATENTS

| | | | |
|---|---|---|---|
| 2,744,228 | 5/56 | Morrison | 307—105 |
| 2,908,812 | 10/59 | Laurent | 328—165 |
| 3,062,078 | 11/62 | Hulls | 80—56.2 |
| 3,084,314 | 4/63 | Ziffer | 80—56.1 |
| 3,100,410 | 8/63 | Hulls et al. | 80—56 |

WILLIAM J. STEPHENSON, *Primary Examiner.*

CHARLES W. LANHAM, *Examiner.*